United States Patent [19]
Fridrich

[11] 3,833,802
[45] Sept. 3, 1974

[54] WIDE ANGLE OPTICAL SYSTEM FOR UNIFORM PLANAR ILLUMINATION

[75] Inventor: Elmer G. Fridrich, Chardon, Ohio

[73] Assignee: General Electric Company, Schenectady, N.Y.

[22] Filed: May 15, 1972

[21] Appl. No.: 253,475

[52] U.S. Cl.............................. 240/41.3, 240/106.1
[51] Int. Cl.............................................. F21v 13/04
[58] Field of Search .... 240/41.3, 41 A, 7.35, 106.1; 355/12; 350/189

[56] References Cited
UNITED STATES PATENTS

| | | | |
|---|---|---|---|
| 3,578,966 | 5/1971 | Levin............................. | 240/106.1 X |
| 3,132,559 | 5/1964 | Kalustyan....................... | 240/41.3 X |
| 3,498,715 | 3/1970 | Gold.............................. | 240/41.3 X |
| 3,428,397 | 2/1969 | Elmer............................ | 240/41.3 X |

Primary Examiner—Richard L. Moses
Attorney, Agent, or Firm—Ernest W. Legree et al.

[57] ABSTRACT

A compact system providing uniform illumination of a plane by means of a compact source and a correcting optical system. The illumination from a point source by itself is proportional to the cosine$^3$ of the angle which a ray from the source makes with the normal to the plane. A wide angle lens refracts radiation from the source into a 90° cone and redistributes it within the cone inversely as the cosine$^3$ of the angle so that the effective illumination on the plane is uniform. The system is particularly useful for obtaining uniform printing exposure of photosensitive plates in offset printing.

8 Claims, 4 Drawing Figures

PATENTED SEP 3 1974

3,833,802

WIDE ANGLE OPTICAL SYSTEM FOR UNIFORM PLANAR ILLUMINATION

BACKGROUND OF THE INVENTION

When a point source is used to illuminate a plane surface, the effective illumination on the surface varies as the cube of the cosine which a ray from the source makes with the normal to the plane. This follows from the combined application of the inverse square law and cosine distribution. The intensity measured in the direction of the source at any point in the plane is inversely proportional to the square of the distance from the source to the point, whereby it is proportional to the $cosine^2$ of the angle. The effective illumination on the surface is proportional to the intensity in the direction of the source times the cosine of the angle which the ray from the source makes with the plane. Thus the effective illumination is proportional to the $cosine^3$ of the angle. This characteristic is sometimes referred to as the cosine cube fall-off in illumination.

In illumination or projection systems where the surface requiring to be illuminated is relatively large or where the need for compactness makes a wide angle optical system necessary, the cosine cube fall-off becomes a major problem. This will readily be appreciated from the fact that where a point source provides a 90° cone of light on a surface, the brightness at the outer edge of the circle of light is barely one third the brightness at the center. In the usual case where a light source or projector must illuminate a rectangular area, the cosine cube fall-off is evidenced by dark corners. A lamp and optics system overcoming the foregoing limitations and providing uniform illumination on a working plane is very desirable.

In the exposure of photosensitive aluminum printing plates (Diazo-plate) for the offset printing process, uniform exposure to ultraviolet radiation over the rectangular printing area is necessary. In the past a carbon arc has been used as the ultraviolet source and the required uniformity of exposure was achieved by using a narrow angle and a long throw or projection distance. This meant that considerable useful space in the printing shop was sacrificed to accommodate the optical system and relatively long exposure times were necessary.

SUMMARY OF THE INVENTION

In accordance with my invention, I achieve substantially uniform illumination of a plane in a short throw by combining a compact source discharge lamp with a wide angle lens which corrects for the $cosine^3$ fall off in effective illumination at angles away from the normal. The lens collects light or radiation over almost 180° and produces a useful 90° cone wherein substantially uniform illumination is achieved. Within the cone, the intensity distribution is such that the size of the virtual image is least on axis and a maximum at about 45° from the axis.

The lens is made of a material which is transmissive of the intended radiation. Where ultraviolet radiation is intended, a high temperature borosilicate glass may be used, but quartz is preferred on account of its superior transmission and its ability to withstand heat shock. The lens is preferably shaped as an aspheric meniscus contoured to a generally ellipsoidal configuration on its outer surface and to a generally hyperboloidal configuration on its inner surface. The lamp is a compact source short arc gap very high pressure lamp. A suitable lamp utilizes a filling of mercury iodide and excess iodine in a thick-walled quartz envelope having a central bulbous portion with necks on opposite sides through which the electrode inleads are sealed. The lens wraps almost a full 180° around the lamp and preferably a spherical reflector subtends the other 180° whereby the lamp is substantially entirely surrounded by lens or reflector.

While the lamp used with my optical system is appreciable in size relative to the lens, the system provides in effect what may be described as point source illumination at the working plane. This is an important advantage in such applications as printing or photographic reproduction because it assures sharp light and shadow lines and thereby improves definition. This is particularly useful where the contact between negative and sensitive plate or film is not perfectly close and uniform, as may happen due to presence of dust or soil.

DETAILED DESCRIPTION

Figure 1:
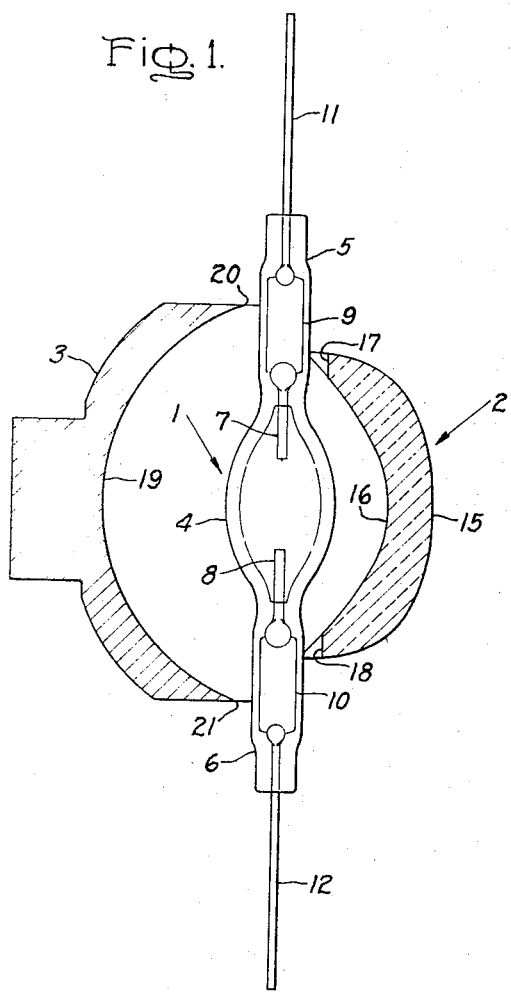
FIG. 1 is a side view partly sectioned through a lamp and optical system embodying the invention.

Referring to FIG. 1, the optical system embodying the invention comprises a compact source arc discharge lamp 1, and an aspheric meniscus lens 2 wrapped almost 180° around it. In a preferred construction a spherical reflector 3 subtends the other 180° around the lamp whereby it is practically completely surrounded by lens or reflector.

The illustrated lamp comprises a vitreous silica envelope having a bulb portion 4 provided with generally cylindrical extensions or necks 5,6. Electrodes 7,8 consisting of short lengths of tungsten rod extend through the necks into the bulb cavity and are welded to molybdenum foils 9,10 which are hermetically sealed within the necks. External inleads 11,12 penetrate into the necks and are welded to the outer ends of the molybdenum foils. The gap between the electrode tips is small, comparable in size to the transverse diameter of the bulb cavity.

The lamp contains a vaporizable metal or metal salt and an inert rare gas to facilitate starting. A preferred filling for a lamp intended to produce ultraviolet radiation is mercury iodide with an excess of iodine and including argon for a starting gas. By way of example, in the illustrated lamp the overall length of the quartz body is 10.5 cm., the arc chamber volume was 2.0 cc., and the dosage consisted of argon at 500 torr, 15 milligrams of $HgI_2$, and about 5 milligrams of excess iodine. The lamp has an electrode gap of approximately 15 mm. and is operated at 5 to 10 atmospheres pressure. The electrical rating is input 200 watts, voltage 100 volts, and current 20 amperes.

Lens 2 consists of fused silica but may also be made of borosilicate glass. Fused silica or quartz is preferred because of its better transmission of ultraviolet radiation and its superior resistance to heat shock. The latter quality is extremely important because the very high loading of the lamp and the proximity of the lens to it results in very rapid heating of the lens to a high temperature when the lamp is turned on. Depending upon the kind of radiation required to be transmitted, other suitable materials may be utilized for the lens.

Figure 4:
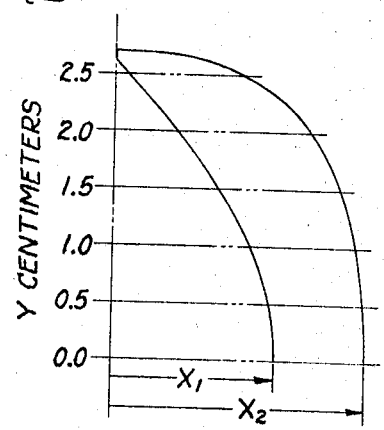
FIG. 4 shows an accurate cross-section of the lens used in the optical system of FIGS. 1 and 2.

The illustrated lens is shaped as an aspheric meniscus with both surfaces concave towards the lamp. The outer surface 15 is contoured to a generally ellipsoidal configuration while the inner surface 16 is contoured to a generally hyperboloidal configuration. Both outer and inner contours over a half section of the lens are accurately reproduced in FIG. 4. The coordinates of the contours are given in Table 1 below wherein the X coordinates are measured from the plane of the rim of the lens and the Y coordinate is measured radially outward from the optical axis. $X_1$ represents the inner surface 16 while $X_2$ represents the outer surface of the lens.

TABLE 1

LENS COORDINATES (centimeters)

| Y | $X_1$ | $X_2$ |
|---|---|---|
| 0.000 | 1.44 | 2.24 |
| 0.125 | 1.43 | 2.24 |
| 0.250 | 1.42 | 2.23 |
| 0.375 | 1.41 | 2.22 |
| 0.500 | 1.39 | 2.21 |
| 0.625 | 1.35 | 2.20 |
| 0.750 | 1.31 | 2.19 |
| 0.875 | 1.26 | 2.17 |
| 1.000 | 1.21 | 2.15 |
| 1.125 | 1.15 | 2.12 |
| 1.250 | 1.08 | 2.09 |
| 1.375 | 1.01 | 2.05 |
| 1.500 | 0.93 | 2.00 |
| 1.625 | 0.85 | 1.95 |
| 1.750 | 0.76 | 1.90 |
| 1.875 | 0.65 | 1.82 |
| 2.000 | 0.56 | 1.74 |
| 2.125 | 0.46 | 1.65 |
| 2.250 | 0.35 | 1.51 |
| 2.375 | 0.22 | 1.34 |
| 2.500 | 0.11 | 1.14 |
| 2.625 | 0.00 | 0.86 |

Computer processing of the foregoing data using the method of least squares polynomial approximation yields the following mathematical expressions for the lens surfaces:

$X_1 = 1.45 - 0.0555Y - 0.192Y^2$ $X_2 = 2.23 + 0.159Y - .487Y^2 + 0.327Y^3 - .0915Y^4$

In order to permit convenient adjustment in position of the lens relative to the lamp, generally semicircular notches 17,18 are cut out at the rim on opposite ends of a diameter. This permits the lens to encompass the lamp around almost a full 180°. The power of the lens increases from a minimum at the center or optical axis to a maximum at an intermediate zone about 45° off axis. Beyond the maximum, the power decreases again to the margin. The lens collects light over almost 180° and concentrates it within a 90° cone. Within that cone, the intensity is decreased at the center and increased up to about 45°. Looking into the lens, one sees on axis a demagnified virtual image of the source, and at 45° to the axis, a distorted image of the source magnified about three times. The net effect is to provide over the 90° cone an intensity distribution per unit solid angle which varies inversely as the cosine$^3$ of the angle which the ray makes with the normal to the lens axis.

Reflector 3 substantially encompasses the lamp on the side opposite from the lens. The reflector may suitably be made of metal such as aluminum and has a spherical mirror surface 19. Semicircular notches 20,21 are cut out at the rim to accommodate the lamp which is positioned so that the midpoint of the arc gap is about at the optical center of the mirror surface. The effect of the reflector is to increase the light output issuing from the lamp in the direction of the lens without changing its distribution. Since the lamp is almost entirely surrounded by either the reflector or the lens, an efficient and relatively "fast" optical system is achieved.

Figure 3:
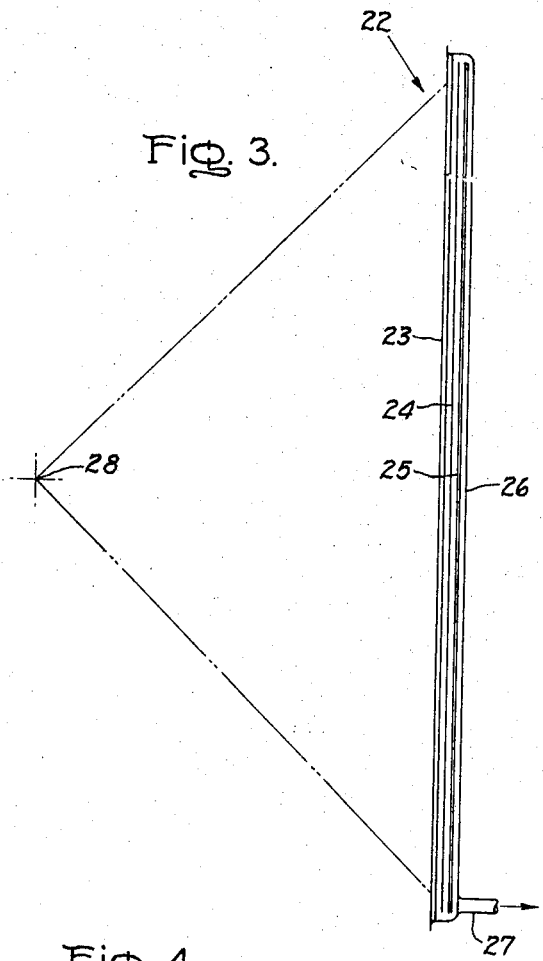
FIG. 3 illustrates a printing frame used with the system.
Figure 2:
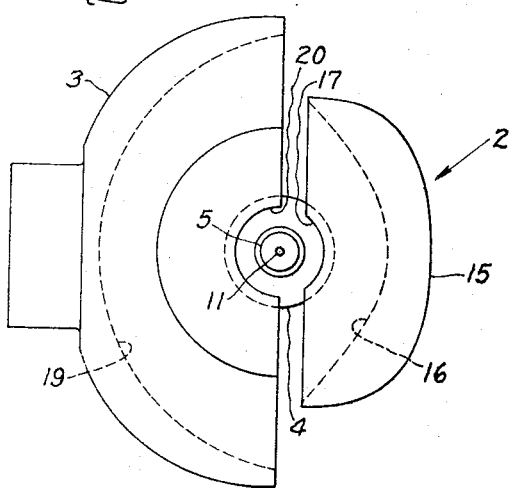
FIG. 2 is a top plan view of the same system.

A typical vacuum frame for exposing sensitized aluminum plates for use in offset lithography is shown at 22 in FIG. 3. The frame comprises a front glass plate 23 which, by way of example, may be 63 inches × 75 inches. A half-tone negative 24 is placed against the backside of the plate and a sensitized aluminum plate 25 is placed against the negative. The chamber is closed by a flexible rubber backing sheet 26 and air is at least partially exhausted at outlet 27 in order to press the sensitized plate and negative firmly together against the glass plate. The ultraviolet light source of the invention is placed at point 28 to illuminate the entire frame. The optical system of the invention achieves uniform printing exposure of photosensitive plates over a 90° cone. This permits the throw or distance from the source to the vacuum frame to be no more than one-half the diagonal dimension of the frame, provided of course that the distance from the lens to the frame is at least several times greater than the lens diameter. The source is preferably boxed or baffled in a manner allowing only the useful radiation which falls on the printing frame to escape and this eliminates the need for curtains or partitions to shield the personnel.

What I claim as new and desire to secure by Letters Patent of the United States is:

1. A wide angle optical system providing substantially uniform illumination of a plane up to a given angle from its optical axis comprising a compact source lamp, a lens of radiation transmissive material encompassing said lamp and collecting radiation therefrom over the major portion of a hemisphere, said lens being contoured as an aspheric meniscus with its outer surface in a generally ellipsoidal configuration and its inner surface in a generally hyperboloidal configuration, said lens being contoured such that the intensity of the transmitted radiation is least on axis and increases approximately inversely as the cosine$^3$ of the angle which a ray makes with the optical axis.

2. An optical system as in claim 1 wherein the lamp is a short arc gap discharge lamp containing a fill of metal halide.

3. An optical system as in claim 1 wherein the lamp is a short arc gap discharge lamp containing a fill of mercury iodide and excess iodine at an operating pressure of several atmospheres.

4. An optical system as in claim 1 wherein the lamp is a short arc gap discharge lamp containing a fill of mercury iodide and excess iodine at an operating pressure of several atmospheres and producing ultra-violet radiation, and said lens is made of fused silica.

5. An optical system as defined in claim 4 wherein the lens is contoured substantially to the profile illustrated in FIG. 4.

6. An optical system as in claim 1 including a spherically contoured reflector encompassing said lamp over the major portion of the hemisphere on the side opposite to said lens.

7. A lens of radiation transmissive material for encompassing a compact source lamp and collecting radiation therefrom over the major portion of a hemisphere, said lens being contoured to an aspheric meniscus with its outer surface in a generally ellipsoidal configuration and its inner surface in a generally hyperboloidal configuration, said lens transmitting useful radiation in a cone of approximately 90° about its optical axis and being contoured such that the intensity of the transmitted radiation is least on axis and increases approximately inversely as the cosine$^3$ of the angle which a ray makes with the optical axis, whereby radiation from the source encompassed by said lens provides substantially uniform illumination of a plane normal to the optical axis.

8. A lens as in claim 7 made of quartz and having substantially the profile illustrated in FIG. 4.

* * * * *